United States Patent [19]

Washburn

[11] 4,336,718
[45] Jun. 29, 1982

[54] CONTROL CIRCUIT FOR ACCELEROMETER

[75] Inventor: John R. Washburn, Grand Rapids, Mich.

[73] Assignee: Lear Siegler, Inc., Santa Monica, Calif.

[21] Appl. No.: 184,796

[22] Filed: Sep. 8, 1980

[51] Int. Cl.³ .............................................. G01P 15/13
[52] U.S. Cl. ............................... 73/517 B; 73/862.61; 318/632
[58] Field of Search ................ 73/517 B, 1 D, 862.61, 73/516 R; 318/651, 632, 662

[56] References Cited

U.S. PATENT DOCUMENTS

| | | | |
|---|---|---|---|
| 2,193,707 | 3/1940 | Baumann | 73/517 R |
| 2,193,910 | 3/1940 | Wilson | 73/517 R |
| 2,995,935 | 8/1961 | Eyestone et al. | 73/517 B |
| 3,797,320 | 3/1974 | Clampitt | 73/517 B |
| 4,088,027 | 5/1978 | Hernandez et al. | 73/517 B |
| 4,094,199 | 6/1978 | Holdren et al. | 73/517 B |
| 4,144,764 | 3/1979 | Hartzell | 73/517 B |

Primary Examiner—James J. Gill
Attorney, Agent, or Firm—Varnum, Riddering, Wierengo & Christenson

[57] ABSTRACT

A pendulously supported proof mass accelerometer wherein a pulse generator applies periodic pulses to a bridge circuit comprising variable resistors and pick-off capacitors to generate a restoring current to maintain the proof mass in a null position. The variable resistors of the bridge circuit provide a means of varying the null position of the proof mass to achieve substantially balanced linear operation of the accelerometer circuitry. A bias compensation circuit applies a correction current to an output circuit which is equal in magnitude and opposite in direction to output current produced by static bias factors of the accelerometer.

22 Claims, 4 Drawing Figures

CONTROL CIRCUIT FOR ACCELEROMETER

FIELD OF THE INVENTION

This invention relates to accelerometers and, more particularly, relates to electrical circuitry adapted to precisely measure displacement of a proof mass due to accelerational forces.

BACKGROUND OF THE INVENTION

Accelerometer apparatus are extensively utilized in aircraft and missile navigational systems and other applications which require such apparatus to be of relatively small size and weight with simple electrical components. Further, these apparatus must be capable of precisely measuring acceleration independent of substantial vibrational effects and wide operating temperature ranges.

One type of prior art accelerometer comprises a proof mass having a torquing coil and "pick-off" capacitors spacially arranged within a magnetic field. As an external acceleration force is applied, movement of the proof mass causes the capacitances of the pick-off capacitors to vary and a resultant current is applied via a servo circuit to the torquing coil to restore electrical and mechanical equilibrium. Current through the coil is measured via a load circuit to provide an external indication of the magnitude and direction of acceleration.

However, several problems can exist in accelerometers in accordance with the previous description. The values of the pick-off capacitors are functions of surface area and spatial air gaps between the surfaces. The spatial gaps may, of course, comprise a medium other than air with a corresponding different dielectric constant. It is extremely difficult to thus construct an accelerometer with pick-off capacitors having precisely equivalent values. Additionally, methods of manufacture and construction of other elements of an accelerometer and its associated circuitry cannot provide exact electronic circuit balance in view of the differential pick-off capacitors. One result of these problems is a dynamic bias effect when the accelerometer is subjected to normal vibrational motion. If exact balance of the electronics is not achieved, the non-equal pick-off capacitors and air gap volumes cause generation of non-zero average output signals in response to this vibrational motion. The accelerometer apparatus is then said to have dynamic bias due to nonlinearity.

A further problem with accelerometers as previously described relates to static bias. Static bias is due to various factors including residual magnetism, mechanical force effects such as static torque on apparatus components, and spring forces in the apparatus. The basic effect of static bias is to produce extraneous signals in the load circuit. Additionally, if certain types of circuitry are utilized to apply a "correction" signal to the load circuit in an attempt to overcome static bias, the signal strength may vary in accordance with differing magnitudes of acceleration forces, thereby causing additional erroneous measurements.

SUMMARY OF THE INVENTION

Advantageously, a technical advance is achieved by an accelerometer arrangement having a pendulously supported indicating means positioned at a null position in the absence of an externally applied acceleration force, wherein the null position can be adjusted to substantially minimize nonlinear effects of vibrational forces applied to the accelerometer. An arrangement in accordance with the invention further provides for application to output circuitry of a correction signal to overcome erroneous acceleration measurements caused by static bias factors of the accelerometer arrangement.

In an accelerometer arrangement in accordance with the invention, the indicating means is pendulously supported within a housing assembly and indicates, via a positional displacement thereof, the occurrence of an externally applied acceleration force. Detection circuit means generates a restoring signal representative of the magnitude and direction of the positional displacement. Restoring means coupled to the detection circuit means is responsive to the restoring signal to return the indicating means to its null position. Output circuit means is electrically coupled to the restoring means and generates an output signal indicative of the magnitude and direction of the acceleration force.

The detection circuit means comprises bridge circuit means electrically coupled to the indicating means for adjusting the null position thereof. Selectively adjustable bias compensation means applies a correction signal to the output circuit means substantially equal in magnitude and opposite in direction to output signal components caused by accelerometer static bias factors.

The bridge circuit means comprises selectively adjustable resistance means and pick-off capacitor means coupled to the indicating means and connected to the resistance means. The resistance means can be adjusted to vary the null position of the indicating means and correspondingly vary capacitance values of the capacitor means. Pulse generator means connected to the bridge circuit means is adapted to generate sequences of periodic pulses, thereby providing generation of pick-off signals indicative of acceleration force magnitude and direction. Differential means connected to the bridge circuit means generates a differential signal indicative of differences between pick-off signals. Servomechanism compensation means is responsive to the differential signal for precisely maintaining the indicating means at its null position in the absence of external acceleration forces. Further, the servomechanism compensation means generates a compensated signal adjusted in phase and gain relationship with respect to the differential signal.

Amplifier means connected to the servomechanism compensation means is responsive to the compensated signal for applying the restoring signal to the restoring means. The restoring means restores the indicating means to its null position and thereby changes the capacitance values of the pick-off capacitor means to values corresponding to this null position. The output circuit means is responsive to the restoring signal for generating an output signal at an output terminal which is indicative of acceleration force magnitude and direction.

Further in accordance with the invention, the bridge circuit means comprises first and second variable resistors commonly connected to a voltage source and further connected to first and second terminals, respectively. The pick-off capacitor means comprises first and second pick-off capacitors, each having a common terminal and another terminal connected to said first and second terminals, respectively. The pulse generator means and the differential means are also connected to the first and second terminals. The pulse generator means and the voltage source cooperate to periodically charge and discharge the pick-off capacitors, thereby producing pick-off voltage signals having average values substantially proportional to the capacitances of the respective pick-off capacitors.

The servomechanism compensation means comprises a phase compensation means responsive to the differential signal for generating the compensated signal with a positive phase shift relative to the differential signal. Additionally, integrator amplifier means connected to the phase compensation means adjusts the gain relationship of the compensated signal to the differential signal.

The bias compensation means comprises circuitry for applying to the output terminal a selectively adjustable correction current signal which is of substantially equal magnitude and opposite in direction to components of current signals through the output circuit means which are caused by static bias factors. Further, the correction current signal has a substantially constant magnitude regardless of the magnitude of voltage signals appearing at the output terminal. The bias compensation means can comprise a plurality of field effect transistors to achieve this constant magnitude correction current signal.

The indicating means of the accelerometer arrangement comprises a pendulously supported proof mass assembly having a plated capacitor surface which cooperates with a stationary surface to form a pickoff capacitor. The plated capacitor surface is supported in a plane at a substantially perpendicular angle with respect to a central axis through the housing assembly. The restoring means comprises an electromagnetic coil mounted on the proof mass assembly, and stationary permanent magnet means. Current through the coil cooperates with the magnetic field produced by the permanent magnet means to adjust positional displacement of the proof mass assembly.

A method for achieving the advantages of the invention in an accelerometer arrangement having a positionally displaceable proof mass comprises the steps of maintaining the proof mass at a null position in the absence of an externally applied acceleration force and displacing the proof mass in response to an applied acceleration force. A restoring signal is generated indicating magnitude and direction of displacement and the proof mass is restored to its null position. Further, an output signal is generated representative of the magnitude and direction of the restoring signal. The null position of the proof mass is adjusted to minimize output signal generation caused by vibrational motion and a correction signal component is added to the output signal to negate any output signal components due to static bias factors. The correction signal component is maintained at substantially constant magnitude regardless of acceleration force magnitude.

DESCRIPTION OF THE DRAWINGS

The invention will now be described with reference to the drawings in which:

FIG. 4 is a detailed diagram of one illustrative embodiment of the bias compensation circuit shown in FIG. 2.

DETAILED DESCRIPTION

Figure 1:
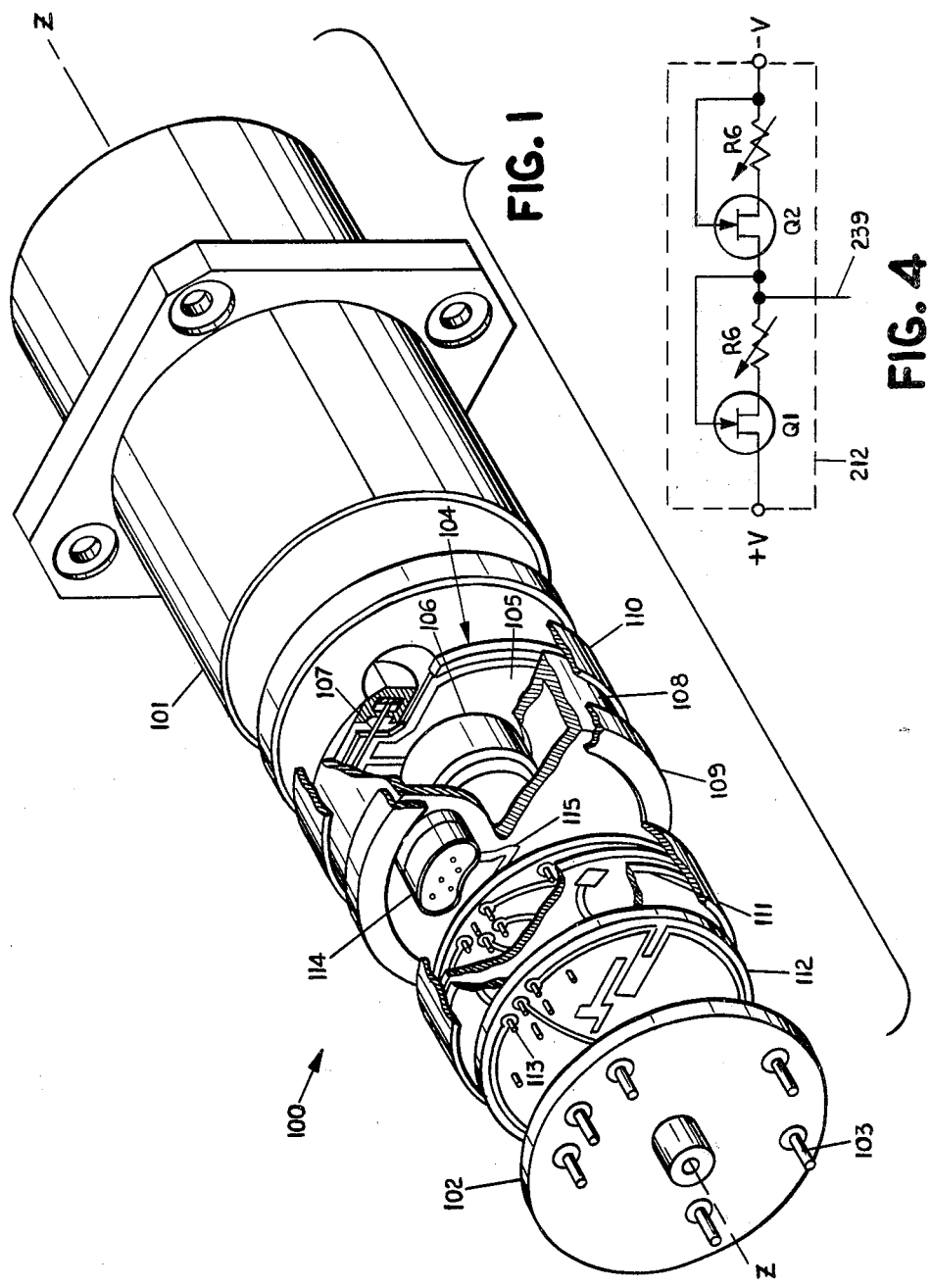
FIG. 1 is an exploded view of one illustrative embodiment of an accelerometer arrangement in accordance with the invention.

The principles of this invention are disclosed, by way of example, in an accelerometer apparatus 100 as depicted in an exploded view in FIG. 1. Accelerometer apparatus 100 comprises a cylindrical accelerometer housing assembly 101 having a central axis Z therethrough and enclosed by a header plate 102 having external electrical contact pins 103 thereon. A proof mass structure 104 comprises plated capacitor surfaces 105 as shown in FIG. 1 and is pendulously supported within housing 101. The capacitor surfaces 105 partially surround, in a semicircular manner, electromagnetic coils 106 perpendicularly extending from each of the capacitor surfaces. The pendulous support is arranged such that the capacitor surfaces 105 comprise a plane substantially perpendicular to central axis Z. The coils 106 and capacitor surfaces 105 are connected to a support ring 107 which is pendulously suspended between two stationary annular permanent magnets by means of conventional bearing assemblies or like connection components. The permanent magnets are not specifically shown in FIG. 1 but reside in magnet housings 108. Also residing in magnet housings 108 are stationary capacitor surfaces which form a pair of "pick-off" capacitors with the plated surfaces 105. The assembly comprising the proof mass 104 and magnet housing 108 is surrounded by insulator material 109 and a sleeve member 110 as partially shown in FIG. 1.

Electrical circuitry of accelerometer apparatus 100 is contained in a hermetically sealed housing 111. Housing 111 comprises contact pins for requisite external connections to further circuitry comprising adjustable resistances which reside on a resistor network plate 112. Contact pins 113 on the network plate 112 provide terminal connections to contact pins 103 on header plate 102. As will be subsequently described herein, the resistances on network plate 112 can be adjusted to overcome nonlinear dynamic bias effects due to the mechanical construction and configuration of the accelerometer apparatus 100.

The electrical circuitry within the housing 111 is connected to elements of proof mass 104 via a connector element 114 as shown in FIG. 1. Below the connector element 114 is a thermally sensitive resistor 115 partially shown in FIG. 1. Resistor 115 is electrically connected in parallel with coils 106 and provides a means for adjusting the temperature coefficient of the acceleration scale factor of coils 106. As evident from subsequent discussion herein, the current which will be generated through the coils 106 is proportional to applied acceleration forces. However, as is well known in the art, the electromagnetic strength of fields created by this current and the annular permanent magnets is partially dependent on temperature. Accordingly, as temperature changes, it is advantageous to adjust the proportionality of the functional relationship of current flow in coils 106 to the magnitude of the externally applied acceleration forces. The parallel connection of resistor 110 provides this adjustment.

With no acceleration force applied to a system comprising the accelerometer apparatus 100, the proof mass 104 is stationary in its "null" position. As acceleration is applied, the proof mass 104 is positionally displaced with respect to the magnets in housing 108. This positional displacement produces relative changes in capacitance between the two "pick-off" capacitors effectively formed by the surfaces in housings 108 and capacitor surfaces 105. Accordingly, the proof mass 104 provides a means for indicating, via positional displacement thereof, the occurrence of an applied acceleration force. The magnitude and direction of the positional displacement is dependent on the acceleration force magnitude and direction.

The electrical circuitry of the accelerometer apparatus 100 comprising the circuit in housing 111 and resistor network on plate 112 detects the positional displacement of the proof mass, and corresponding changes in capacitance values produce application of a current to coils 106 which is of a magnitude and direction as to be representative of the positional displacement. This applied "torquing" current to coils 106 is therefore also proportional to the magnitude and direction of the applied acceleration force. This torquing current cooperates with the magnetic field created by the stationary annular magnets to restore the proof mass 104 to its null position. Accordingly, coils 106 and the permanent magnets in housing 108 can be characterized as a restoring means for restoring the means for indicating the presence of applied acceleration forces to its null position via the generation of the "restoring" torquing current from electrical detection circuitry. As subsequently described herein, the torquing current is measured via a load circuit connected to coils 106, thereby providing a means for quantitatively measuring the applied acceleration force.

It should be noted that accelerometer apparatus utilizing pick-off capacitors and a pendulously supported proof mass with electrical coils in a magnetic field is generally known in the art. Such apparatus is disclosed in U.S. Pat. No. 2,995,935 Eyestone et al issued Aug. 15, 1961. Further, utilization of bearing assemblies to suspend a proof mass in an acceleration measuring device is disclosed in U.S. Pat. No. 2,193,707 Baumann, issued Mar. 12, 1940, and U.S. Pat. No. 2,193,910 Wilson, issued Mar. 19, 1940. Accordingly, the aforementioned structures are not considered novel concepts of the invention and the basic mechanical elements and the various interconnections thereof shown in FIG. 1 are well known in the art. The illustrative embodiment of an accelerometer shown in FIG. 1 is merely exemplary of apparatus in which the subsequently described electrical circuitry in accordance with the invention can be utilized.

Figure 2:
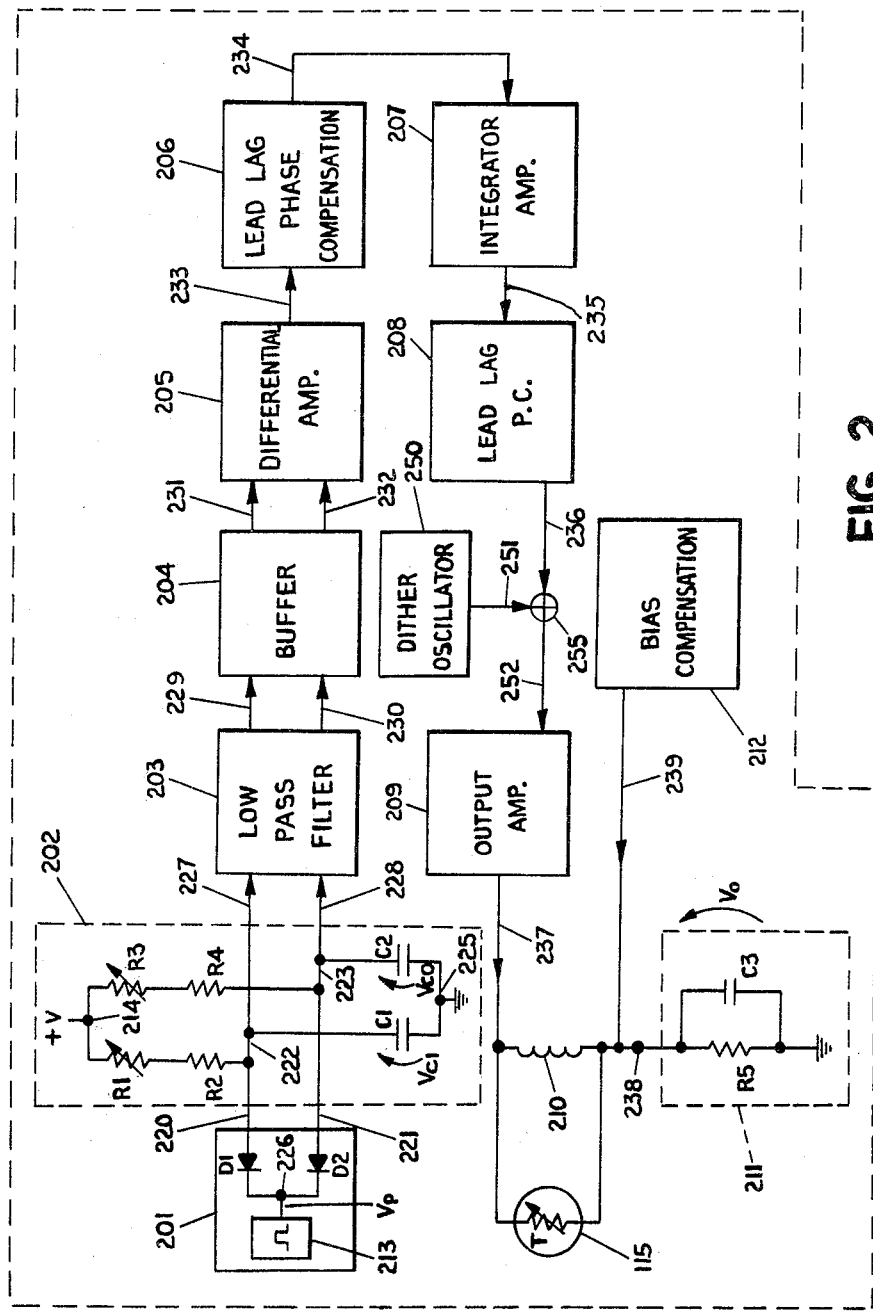
FIG. 2 is a block diagram of electrical circuitry of the illustrative embodiment shown in FIG. 1.

A block diagram comprising the various electrical elements of accelerometer apparatus 100 is depicted in FIG. 2 as electrical circuit 200. Circuit 200 comprises a pulse generator 201 having a voltage oscillator 213 connected to a pair of diodes D1 and D2 at a terminal 226. Oscillator 213 generates a sequence of periodic binary voltage pulses at terminal 226 which are applied to conductors 220 and 221 through diodes D1 and D2, respectively. The specific diode configuration shown in FIG. 2 provides for discharging of pick-off capacitors by the periodic pulses as subsequently described herein. Voltage oscillator 213 and the diode configuration of pulse generator 201 shown in FIG. 2 are well known in the art.

The conductors 220 and 221 are respectively connected to diametrically opposed terminals 222 and 223 of a bridge circuit 202. Bridge circuit 202 comprises adjustable resistors R1 and R3 connected together at a common terminal 224 having a positive DC voltage source +V applied thereto. The adjustable resistances R1 and R3 reside on the resistor network plate 112 depicted in FIG. 1 and previously described herein. As shown in FIG. 2, the leg of bridge circuit 202 which comprises adjustable resistance R1 is also connected to terminal 222 and further comprises a fixed resistance R2 in series combination with the resistance R1. Similarly, the bridge circuit leg comprising adjustable resistance R3 has a series connected fixed resistance R4 and is connected to terminal 223.

Bridge circuit 202 further comprises a pair of pick-off capacitors C1 and C2 connected together at a common terminal 225 which is also connected to a ground potential of the accelerometer. Other terminals of pick-off capacitances C1 and C2 are connected to the terminals 222 and 223, respectively, as shown in FIG. 2. These pick-off capacitors C1 and C2 are partially formed in the magnet housing 111 depicted in FIG. 1 and comprise the previously described plated capacitance surfaces 105. Accordingly, the pick-off capacitors C1 and C2 as shown in FIG. 2 are part of the electrical configuration of proof mass 104.

As previously described in the section entitled "Background of the Invention" herein, accelerometer apparatus utilizing pick-off capacitors can have nonlinear characteristics due to dynamic bias effects. In any "real" accelerometer apparatus utilizing positional displacement to indicate acceleration force application, it is substantially impossible to construct the apparatus in a manner such that normal vibrational motion will produce no erroneous indication of applied acceleration force. In prior art accelerometers having a mechanical arrangement similar to that of the illustrative embodiment described herein, the air gaps on each side of the plated capacitor surfaces would have to be of equal volumes and the surfaces would have to be of equal areas to provide error free operation in response to dynamic bias effects such as vibrational motion. In accordance with the invention, such dynamic bias nonlinear operation is overcome with adjustable resistances R1 and R3 which can be varied to apply a bias voltage to the pickoff capacitors C1 and C2 of proof mass 104. This bias voltage can effectively adjust the null position of plated capacitor surfaces 105 depicted in FIG. 1 and, accordingly, adjust the capacitances of pick-off capacitors C1 and C2 depicted in FIG. 2 to minimize dynamic bias effects. This bias voltage will be of a value such as to cause subsequently described pick-off capacitor voltage signals to have differential average values substantially equal to zero when such signals are due to vibrational motion.

Figure 3:
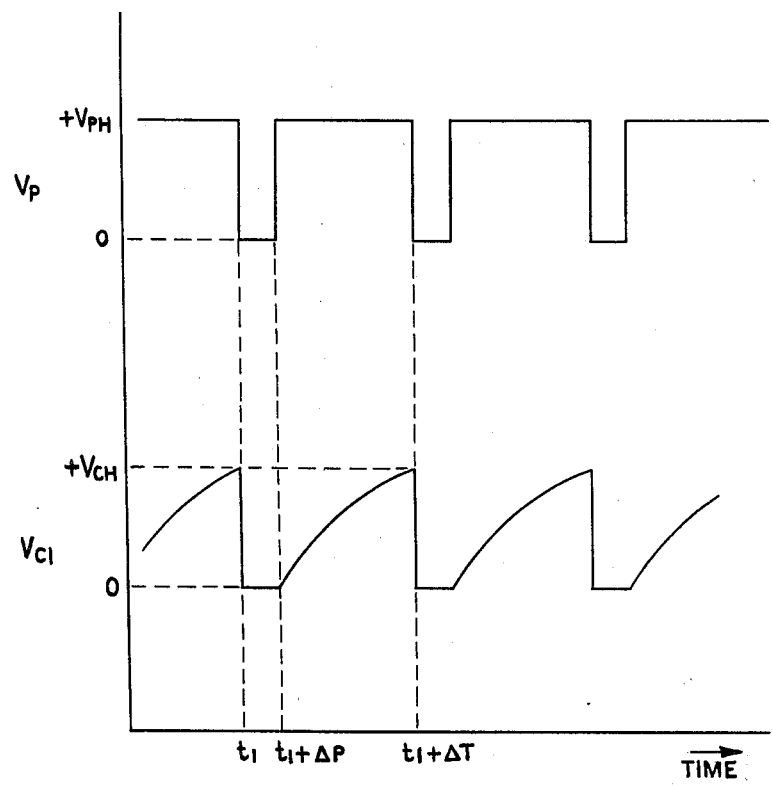
FIG. 3 is a timing diagram of voltage signals generated in the electrical circuitry shown in FIG. 2.

FIG. 3 illustrates the operation of oscillator 201 and bridge circuit 202 shown in FIG. 2 when no acceleration is applied to the accelerometer apparatus. The voltage across capacitor C1 is depicted as $V_{C1}$ in FIGS. 2 and 3 and corresponds to the voltage at terminal 222 with respect to ground terminal 225. The voltage at terminal 226 of pulse generator 201 is depicted as $V_P$ with respect to ground potential. Specifically referring to FIG. 3, a negative pulse transition of voltage $V_P$ occurs at time $t_1$, reducing voltage $V_P$ from a value of $V_{PH}$ to substantially zero. When this pulse transition occurs, diode D1 is effectively rendered conductive and capacitor voltage $V_{C1}$ is discharged from a value of $+V_{CH}$ through diode D1. It is assumed that the discharge path through diode D1 is of an impedance characteristic such that the time constants associated therewith are extremely small relative to the pulse duration $\Delta P$ of voltage $V_P$.

While voltage $V_P$ remains substantially at zero during the pulse duration $\Delta P$, capacitor voltage $V_{C1}$ is effectively "latched" at zero voltage via diode D1. As shown in FIG. 3, a positive pulse transition of voltage $V_P$ occurs at time $t_i+\Delta P$. This positive transition to a value of $V_{PH}$ "turns off" diode D1 and voltage $V_{C1}$ begins to exponentially increase toward the value of voltage source $+V$ at terminal 214. However, capacitor voltage $V_{C1}$ is again discharged when another negative pulse transition of voltage $V_P$ occurs at time $t_i+\Delta T$. Further, the resistance and capacitance values of circuit elements in bridge circuit 202 are chosen such that the exponential waveform of voltage $V_{C1}$ between time $t_1+\Delta P$ and time $t_1+\Delta T$ can be approximated as a linear "sawtooth" shaped waveform. Accordingly, as known in the art of circuit design, the average value of capacitor voltage $V_{C1}$ is substantially proportional to the capacitance of pick-off capacitor C1.

The bridge circuit 202 is effectively symmetrical with respect to pulse generator 201 such that capacitor voltage $V_{C2}$ across pick-off capacitor C2 depicted in FIG. 2 has a waveshape substantially identical to that of the previously described capacitor voltage $V_{C1}$. Accordingly, when no acceleration force is applied to the accelerometer apparatus, the average values of voltages $V_{C1}$ and $V_{C2}$ at respective terminals 222 and 223 are substantially equal. Further, as previously described, the adjustable resistances R1 and R3 provide a means for substantially equalizing the average values of these voltages when capacitance fluctuations of pick-off capacitors C1 and C2 occur due to vibrational motion or other dynamic bias effects. However, when an actual acceleration force is applied to the accelerometer apparatus, the pick-off capacitors C1 and C2 substantially change in capacitance values. Specifically, as described with respect to FIG. 1, plated capacitor surfaces 105 are moved from a null position to a displaced position wherein the quantitative and directional displacement of proof mass 104 is proportional to the magnitude and direction of the applied acceleration force. As displacement occurs, one of pickoff capacitors C1 and C2 will increase in capacitance value while the other decreases in value. Since the average values of pick-off capacitor voltages $V_{C1}$ and $V_{C2}$ are substantially proportional to the capacitances of pick-off capacitors C1 and C2, respectively, differential pick-off voltage signals occur at terminals 222 and 223. The difference between the average values of these voltage signals is proportional to the applied acceleration force.

The selection of components and values thereof for pulse generator 201 and bridge circuit 202 are dependent on various factors such as desired mechanical and electrical sensitivity of the accelerometer arrangement to applied acceleration forces. For example, the time $\Delta T$ depicted in FIG. 3 corresponds to the operational frequency of pulse generator 201. The higher this frequency, the more simplistic can filters be designed to subsequently "filter out" components of acceleration force indicating signals occurring at this frequency. However, the lower this frequency, the greater the magnitude of differential average pickoff capacitor voltages for a specific displacement of proof mass 104. Other design considerations include resistor sizes and supply voltage limitations. The selection process for components of circuit 200 is well within the scope of persons skilled in the art of accelerometer design having knowledge of the disclosure herein. For example, an accelerometer arrangement functionally corresponding to the embodiment described herein can utilize a pulse generator frequency wherein $\Delta P = 250$ nanoseconds and $\Delta T = 1$ microsecond. Further, the circuitry can be designed such that $+V = 15$ volts, $+V_{PH} = 8$ volts, and $V_{CH} = 5$ volts. It should be noted that the aforementioned design values are merely exemplary and accelerometer circuitry in accordance with the invention is not limited to these values.

Further with respect to component selection, when bridge circuit 202 is operating as previously described, currents are flowing through the bridge circuit legs comprising resistances R1 through R4 as shown in FIG. 2. Since resistances R1 and R3 are adjustable, the fixed resistances R2 and R4 can be chosen to provide safe magnitudes of current therethrough during operation. The selection of components and values thereof for both the oscillator 201 and bridge circuit 202 is well within the knowledge of a person skilled in the art of circuit design.

As shown in FIG. 2, the pick-off voltage signals $V_{C1}$ and $V_{C2}$ are applied as input signals to low pass filter circuit 203 via conductors 227 and 228, respectively. Low pass filter circuit 203 is well known in the art and is responsive to signals $V_{C1}$ and $V_{C2}$ to generate low frequency output voltage signals, wherein signal components having a frequency corresponding to the pulse generator frequency are effectively removed. These output voltage signals are generated on conductors 229 and 230 and have low frequency voltage levels corresponding to the average values of signals $V_{C1}$ and $C_{C2}$, respectively.

These output voltage signals on conductors 229 and 230 are applied as input signals to buffer circuit 204 shown in FIG. 2. Buffer circuit 204 provides electrical isolation between the low input impedance of differential amplifier 205 subsequently described herein and the relatively high output impedance of bridge circuit 202. The output voltage signals of buffer circuit 204 on conductors 231 and 232 functionally correspond to the previously described voltage signals on conductors 229 and 230, respectively, i.e., low frequency average value voltage signals. The internal circuitry of buffer circuit 204 can comprise any one of numerous circuit designs generally known in the art. For example, a pair of "voltage follower" operational amplifier circuits can be utilized to accomplish the buffering function. Each of the voltage signals on conductors 231 and 232 is applied as an input signal to differential amplifier circuit 205 as depicted in FIG. 2. Circuit 205 generates a differential output voltage signal on conductor 233 which directly corresponds to the quantitative difference between the voltage signals on conductors 231 and 232. This differential output voltage signal on conductor 233 thus corresponds both to differential capacitance values of pick-off capacitors C1 and C2, and, in accordance with previous discussion, to the externally applied acceleration force. The design of differential amplifier circuit 205 to accomplish the aforementioned functions is well-known in the art.

The differential voltage signal on conductor 233 is applied as an input signal to phase compensation circuit 206 as shown in FIG. 2. The phase compensation circuit 206 is often designated in the art as a "lead-lag" circuit. As will be evident from subsequent discussion herein, the accelerometer circuit 200 depicted in FIG. 2 is a feedback circuit for positioning of proof mass 104, i.e., a servomechanism. As known in the art of servomechanism design, such feedback circuits are susceptible to oscillatory instability due to inherent frequency characteristics of their associated mechanical assemblies.

These frequency characteristics can cause positional corrections in the direction of equilibrium to actually overcompensate and cause successive displacement from the equilibrium position to increase in an oscillatory manner. Additionally, as also known in the servomechanism design art, sequential utilization of feedback circuitry elements produces phase lag of the "fed back" signals with respect to the input "disturbing" signals. Phase lag is acceptable and actually advantageous since feedback signals in phase with input disturbing signals can cause oscillatory instability. However, in numerous servomechanism circuits, this phase lag through a servo feedback loop can approach 360°, thereby producing unstable operating characteristics.

Such tendencies of oscillatory instability due to the aforementioned servomechanism characteristics can in part be offset by generating a positive phase shift within the feedback circuit at the predetermined expected frequencies of applied acceleration. The range of these expected frequencies is defined as the "servo loop bandwidth". Phase compensation circuit 206 generates an output signal on conductor 234 comprising frequency components within the servo loop bandwidth having a positive phase shift with respect to corresponding frequency components of the voltage signal on conductor 233. The general concept of generating positive phase shift at servo loop bandwidth frequencies via phase compensation circuitry is well known in the art. Compensation circuit 206 can comprise any one of numerous designs and selection of specific components to provide the requisite phase shift is dependent on the specific type of accelerometer apparatus utilized and the desired response characteristics thereof to applied acceleration forces.

The phase shifted voltage signal on conductor 234 is applied as an input signal to an integrator amplifier circuit 207 as depicted in FIG. 2. Amplifier circuit 207 provides gain control of accelerometer circuit 200 in a manner which is functionally dependent on the frequency of the voltage signal on conductor 234 and hence is therefore dependent on the frequency of the applied acceleration force. The concept of utilizing integration-type gain control circuits is well known in the art of servomechanism design to achieve reduction of static "following" errors. Preferably, amplifier circuit 207 comprises a capacitive feedback loop such that amplifier gain will be very high for input signals on conductor 233 which are of DC level or which comprise frequency components less than the servo loop bandwidth range. The physical effect of this gain characteristic is to "stiffen" the proof mass 104 with respect to low frequency vibrations, thereby reducing bias errors due to proof mass inertia, etc. Accordingly, accuracy is enhanced in that accelerometer circuit 200 can maintain the proof mass 104 at a very precise null position under static conditions.

With the use of capacitive feedback in amplifier circuit 207, gain can be substantially reduced for input signal frequencies in the servo loop bandwidth range. The effect of the substantially reduced gain at servo loop bandwidth frequencies, in combination with the previously described function of phase compensation circuit 206, is to achieve substantial stability of operation while also providing requisite response speed and accuracy when repositioning the proof mass 104 to its null position. Accordingly, circuits 206 and 207 can be characterized as servomechanism compensation circuitry to adjust relative gain and phase of signals responsive to both externally applied acceleration forces and to other disturbances of proof mass 104.

The phase and gain compensated output voltage signal of integrator amplifier circuit 207 is applied as an input voltage signal to a second phase compensation circuit 208 via conductor 235 as shown in FIG. 2. Phase compensation circuit 208 is identical in function to the previously described phase compensation circuit 206 and merely provides additional positive phase shift through the accelerometer circuit 200 of frequency components of the voltage signal on conductor 235 which correspond to servo loop bandwidth frequencies. The functions of phase compensation circuits 206 and 208 can be combined in a single compensation circuit without departing from the novel concepts of the invention.

The phase and gain compensator output voltage signal of circuit 208 is applied as an input signal to a summing circuit 255 via conductor 236 as depicted in FIG. 2. Also applied to circuit 255 is a continuous square wave dither signal on conductor 251 from dither oscillator 250. The dither signal is of a sufficient magnitude and frequency to apply an "electrical torque" by means of torquing coil 210 subsequently described herein to compensate for "stiction", i.e. the static friction existing between elements which must be overcome when commencing relative movement therebetween. The dither oscillator 250 and summing circuit 255 are well-known and are of conventional design. Oscillator 250 comprises an astable multivibrator (free running oscillator) which generates the continuous square wave signal on conductor 251.

The resultant output signal of circuit 255 on conductor 252 is an additive signal comprising both the phase and gain compensated output signal of circuit 208 and the dither output signal of oscillator 250. This additive signal is applied as an input voltage signal to output amplifier circuit 209 as depicted in FIG. 2. Amplifier circuit 209 generates an output signal on conductor 237 which is sufficient to apply requisite driving current to torquing coil 210 and load circuit 211 subsequently described herein. It should be noted that amplifier circuit 209 is not necessarily a "voltage to current" converter in that the magnitude of current on conductor 237 through the torquing coil 210 can be partially dependent on the impedances of the coil 210 and load circuit 211.

Preferably, the amplifier circuit 209 can comprise one or more components such as resistive elements which are variable and can be adjusted at the time the accelerometer apparatus is constructed to provide adjustment of overall loop gain in the accelerometer circuit 200. The actual components utilized in accelerometer circuit 200 all have value tolerances, thereby usually prohibiting the achievement of exact gain characteristics in accordance with circuit design requirements. The capability of gain adjustment in the output amplifier circuit 209 after completion of accelerometer construction allows for control of actual loop gain to offset the effects of circuit element error tolerances. Output amplifiers functionally corresponding to amplifier circuit 209 are generally known in the art.

The current on conductor 237 can be characterized as a "restoring" current signal and is applied through the parallel combination of thermally sensitive resistor 115 and torquing coil 210. As previously described, resistor 115 provides a means for modifying the amount of restoring current flowing through coil 210 as a function of operating temperature of the accelerometer apparatus. With knowledge of the disclosure herein, persons skilled in the art of accelerometer circuit design can readily select apparatus corresponding to resistor 115 and coil 210.

Torquing coil 210 is an electrical schematic model of the electromagnetic restoring coils 106 previously described and depicted in FIG. 1. As restoring current is applied through coil 210, an electromagnetic field is generated which reacts with the fields of the accelerometer permanent magnets and tends to return the proof mass 104 to its null position. Thus, the torquing coil restoring current is of a direction and magnitude which tends to restore equilibrium of the proof mass and pick-off capacitors C1 and C2 shown in FIG. 2. In accordance with the previous description of accelerometer circuit 200, the magnitude and direction of the torquing coil restoring current is indicative of the magnitude and direction of the applied acceleration force.

To measure this restoring current, a load circuit 211 is connected to an output terminal 238 of accelerometer circuit 200 as depicted in FIG. 2. Circuit 211 comprises a parallel combination of a fixed value resistor R5 and a fixed value capacitor C3, each having a common terminal connected to terminal 238 of the torquing coil 210. The other common terminal of resistor R5 and capacitor C3 is connected to ground potential. The output voltage measured at terminal 238 with respect to ground, designated $V_O$ in FIG. 2, is substantially proportional to the current through torquing coil 210 and thus provides a proportional indication of the applied acceleration force. Capacitor C3 in load circuit 211 effectively filters out any high frequency signal components to provide a more precise output voltage indication of the applied acceleration force.

It should be noted that terminal 238 shown in FIG. 2 is an output terminal which can be connected to one of the header pins 103 depicted in FIG. 1. Accordingly, load circuit 211 is not necessarily an element of the internal electronics of the accelerometer circuitry. Rather, it is merely representative of a type of external load circuit which can be utilized to provide external measurement of signals in circuit 200. Other load circuits can also be utilized without departing from the novel aspects of the invention.

One problem previously discussed with respect to servo controlled accelerometers relates to static bias effects. Residual magnetism, spring forces, static torque, and other static bias factors can cause generation of extraneous signals in the accelerometer circuitry which are independent of any applied acceleration force. These extraneous signals result in a bias current appearing through torquing coil 210 and also appearing in load circuit 211. Accordingly, voltage $V_O$ can comprise a bias component which produces an erroneous indication of an applied acceleration force. To overcome measurement errors due to these static bias factors, a bias compensation circuit 212 is connected between torque coil 210 and terminal 238 via conductor 239 as shown in FIG. 2. When the accelerometer apparatus is constructed, the effect of static bias factors can be determined by measuring the current through load circuit 211 when no acceleration is applied to the apparatus. Bias compensation circuit 212 is then adjusted to generate a correction current on conductor 239 which is equal and opposite in polarity to the measured load circuit current due to static bias. Since the DC impedance measured from coil 210 back towards the accelerometer circuitry on conductor 237 is substantially greater than the impedance of resistor R5 and load circuit 211, substantially all of the DC current generated by compensation circuit 212 on conductor 239 flows through resistor R5. Accordingly, the compensation circuit 212 negates the erroneous effecs of static bias factors on acceleration force measurements.

A further problem can occur if certain types of bias compensation circuitry are utilized to provide the aforementioned correction current. The voltage $V_O$ at terminal 238 will change in accordance with applied acceleration force. Therefore, if bias compensation circuit 212 is effectively a "voltage source" circuit, the correction current applied to load circuit 211 will also change in accordance with applied acceleration force, again resulting in erroneous acceleration measurements. To overcome this problem, a bias compensation circuit which is effectively a "constant current" source can be utilized in accordance with the invention.

FIG. 4 depicts an illustrative embodiment of bias compensation circuit 212 which operates as a constant current source over wide ranges of load circuit voltages and, accordingly, over wide ranges of applied acceleration forces. The compensation circuit depicted in FIG. 4 comprises a pair of n-channel field effect transistors (FET's) Q1 and Q2 well known in the circuit design art. As shown in FIG. 4, the drain terminal of FET Q1 is connected to DC voltage source +V. Each of the FET's Q1 and Q2 also has its gate terminal connected to its corresponding source terminal through a variable resistor R6. Additionally, the gate terminal of FET Q2 is connected to a DC voltage source −V, and the gate terminal of FET Q1 is connected to the drain terminal of FET Q2 and the conductor 239. The bias compensation circuit configuration shown in FIG. 4 generates a current which is effectively independent of the voltage on conductor 239 over a substantially wide range of magnitudes of load voltage $V_O$. Resistors R6 can be individually adjusted to provide the requisite magnitude and direction of correction current on conductor 239 as previously discussed. Accordingly, the bias compensation circuit 212 provides a means for correcting erroneous acceleration force measurements via load circuit 211 regardless of the magnitude or direction of applied acceleration forces.

The principles of the invention are not limited to the specific accelerometer arrangement described herein for determining applied acceleration via measurement of restoring current through a positionally displaced torquing coil. It will be apparent to those skilled in the art that modifications and variations of the abovedescribed illustrative embodiment of the invention may be effected without departing from the spirit and scope of the novel concepts of the invention.

The embodiments of the invention in which an exclusive property or privilege is claimed are defined as follows:

1. An accelerometer adapted to measure magnitude and direction of an acceleration force externally applied thereto and comprising:
   an accelerometer housing assembly;
   indicating means pendulously supported within said housing assembly for indicating, via a positional displacement thereof, the occurrence of said acceleration force, wherein said indicating means is pendulously supported at a null position in the absence of said acceleration force;

detection circuit means for detecting said positional displacement of said indicating means and for generating a restoring signal representative of the magnitude and direction of said positional displacement;

restoring means coupled to said detection circuit means and responsive to said restoring signal for restoring said indicating means to said null position;

output circuit means electrically coupled to said restoring means and comprising an output terminal for generating an output signal thereat indicative of the magnitude and direction of said externally applied acceleration force; and characterized in that said accelerometer further comprises bias compensation circuit means connected to said output terminal and selectively adjustable to apply a correction signal to said output circuit means, wherein said correction signal is of a substantially equal magnitude and opposite in direction to components of said output signal due to static bias factors.

2. An accelerometer in accordance with claim 1 characterized in that said detection circuit means further comprises bridge circuit means electrically coupled to said indicating means for varying said null position of said indicating means.

3. An accelerometer in accordance with claim 1 characterized in that said detection circuit means further comprises servomechanism compensation means for adjusting the gain and phase of signals applied through said detection circuit means and for precisely maintaining said indicating means at said null position in the absence of said externally applied acceleration force.

4. An accelerometer in accordance with claim 2 characterized in that said bridge circuit means comprises resistance means and pick-off capacitor means connected to said resistance means wherein said resistance means is selectively adjustable for varying capacitance values of said pick-off capacitor means and said pick-off capacitor means is adapted to change said capacitance values in response to said positional displacement of said indicating means.

5. An accelerometer arrangement in accordance with claim 2 characterized in that said detection circuit means further comprises:
pulse generator means connected to said bridge circuit means for generating sequences of pulses wherein said bridge circuit means is responsive to said sequences of pulses for generating pick-off signals indicative of the magnitude and direction of said externally applied acceleration force;
differential means connected to said bridge circuit means and responsive to said pick-off signals for generating a differential signal representative of differences between said pick-off signals and further representative of the magnitude and direction of said externally applied acceleration force;
servomechanism compensation means connected to said differential means and responsive to said differential signal for generating a compensated signal adjusted in gain and phase relationship with respect to said differential signal; and
amplifier means connected to said servomechanism compensation means and responsive to said compensated signal for applying said restoring signal to said restoring means.

6. An accelerometer in accordance with claim 5 characterized in that said bridge circuit means comprises:
a voltage source;
first and second terminals;
first and second variable resistors commonly connected to said voltage source and further connected to said first and second terminals, respectively; and
first and second pickoff capacitors each having a common terminal and connected to said first and second terminals, respectively.

7. An accelerometer in accordance with claim 2 or claim 5 characterized in that said bridge circuit means comprises;
resistance means and pick-off capacitor means connected to said resistance means wherein said resistance means is selectively adjustable for varying capacitance values of said pick-off capacitor means and said pick-off capacitor means is adapted to change said capacitance values in response to said positional displacement of said indicating means; and
said restoring means is responsive to said restoring signal to change said capacitance values to values corresponding to said indicating means being in said null position.

8. An accelerometer in accordance with claim 2 characterized in that said detection circuit means further comprises:
pulse generator means connected to said bridge circuit means for generating sequences of periodic pulses;
pick-off capacitor means coupled to said indicating means and connected to said pulse generator means and having capacitances which vary in accordance with variations in magnitude and direction of said positional displacement; and
resistance means connected to said pick-off capacitor means and to said pulse generator means and selectively adjustable for varying said null position of said indicating means, thereby varying said capacitances of said pick-off capacitor means.

9. An accelerometer in accordance with claim 8 characterized in that said detection circuit further comprises:
voltage source means connected to said resistance means for charging said pick-off capacitor means;
said pulse generator means is adapted to apply said sequences of periodic pulses to said pick-off capacitor means, thereby periodically discharging said pick-off capacitor means; and
said voltage source means and said pulse generator means cooperate to generate periodic pick-off voltage signals across said pick-off capacitor means.

10. An accelerometer in accordance with claim 9 characterized in that said resistance means comprises first and second variable resistors each having a terminal connected to said voltage source means, and said pick-off capacitor means comprises first and second pick-off capacitors connected to other terminals of said first and second variable resistors, respectively; and
said pick-off voltage signals comprise first and second pick-off voltage signals across said first and second pick-off capacitors, respectively.

11. An accelerometer in accordance with claim 10 characterized in that said positional displacement of said indicating means increases the capacitance value of one of said first and second pick-off capacitors and decreases the capacitance value of the other of said first and second pick-off capacitors, and the average value of said first pick-off voltage signal is substantially proportional to the capacitance value of said first pick-off capacitor, and the average value of said second pick-off voltage signal is substantially proportional to the capacitance value of said second pick-off capacitor.

12. An accelerometer in accordance with claim 11 characterized in that said detection means further comprises:
   differential means connected to said first and second terminals for generating a differential voltage signal representative of the difference between average values of said first and second pick-off voltage signals; and
   servomechanism compensation means connected to said differential means and responsive to said differential voltage for generating a compensated voltage signal adjusted in gain and phase relationship with respect to said differential voltage signal.

13. An accelerometer in accordance with claim 12 characterized in that said servomechanism compensation means comprises:
   phase compensation means responsive to said differential voltage signal for generating said compensated voltage signal with a positive phase shift relative to said differential voltage signal;
   integrator amplifier means connected to said phase compensation means and responsive to said differential voltage signal for generating said compensated voltage signal with an adjusted gain relative to said differential voltage signal;
   said phase compensation means generates said compensated voltage signal with a positive phase shift relative to said differential voltage signal only for components of said differential voltage signal having frequencies within a predetermined frequency bandwidth corresponding to expected frequencies of said externally applied acceleration; and
   said integrator amplifier means generates said compensated voltage signal with a substantially high gain for components of said predetermined frequency bandwidth, and generates said compensated voltage signal with a substantially lower gain for components of said differential voltage signal having frequencies within said predetermined frequency bandwidth.

14. An accelerometer in accordance with claim 13 characterized in that said detection circuit means further comprises a dither oscillator for applying a continuous square wave dither signal to said restoring means, thereby overcoming effects of static friction on said indicating means.

15. An accelerometer in accordance with claim 13 characterized in that said detection circuit means further comprises output amplifier means connected to said integrator amplifier means and responsive to said compensated voltage signal to apply said restoring signal to said restoring means wherein said restoring signal comprises a restoring current signal proportional to said compensated voltage signal for restoring said indicating means to said null position.

16. An accelerometer in accordance with claim 15 characterized in that said accelerometer further comprises a thermally sensitive resistor connected to said restoring means for adjusting the proportion of said restoring current signal which is applied to said restoring means wherein said proportion is functionally dependent on operating temperature of said accelerometer arrangement.

17. An accelerometer in accordance with claim 15 characterized in that said restoring current signal comprises signal components representative of static bias effects of said accelerometer and said correction signal comprises a current signal having a magnitude and direction opposite to the magnitude and direction of said signal components of said restoring current signal representative of static bias effects.

18. An accelerometer in accordance with claim 1 or claim 17 characterized in that said bias compensation means comprises a bias compensation circuit which generates said correction signal with a substantially constant magnitude regardless of the magnitude or direction of said output signal.

19. An accelerometer in accordance with claim 18 characterized in that said bias compensation circuit comprises a plurality of field effect transistors.

20. An accelerometer arrangement in accordance with claim 1 or claim 17 characterized in that said indicating means comprises a proof mass assembly pendulously supported within said accelerometer housing assembly; and
   said restoring means comprises an electromagnetic coil and permanent magnet means for generating a magnetic field wherein the application of current through said electromagnetic coil cooperates with said magnetic field to adjust positional displacement of said proof mass assembly.

21. In a method for measuring the magnitude and direction of an externally applied acceleration force wherein:
   a proof mass is maintained at a null position in the absence of said externally applied acceleration force;
   said proof mass is positionally displaced in response to said externally applied acceleration;
   a restoring signal indicative of the magnitude and direction of positional displacement of said proof mass is generated;
   said proof mass is restored to said null posiion in response to said restoring signal; and
   an output signal representative of the magnitude and direction of said restoring signal is generated;
   the improvement which comprises adjusting said null position of said proof mass to substantially minimize the generating of said output signal in response to vibrational motion of said proof mass; and
   adding to said output signal a correction signal component equal in magnitude and opposite in direction to a component of said output signal resultant from static bias factors of said accelerometer.

22. The method in accordance with claim 21 wherein said method is performed on an accelerometer comprising resistance means and characterized in that said method further comprises the steps of:
   adjusting said resistance means to adjust said null position of said proof mass; and
   maintaining said correction signal component at a substantially constant magnitude regardless of the magnitude or direction of said externally applied acceleration.

* * * * *